Aug. 15, 1939.　　　E. F. SMITH　　　2,169,296
LUBRICATING APPARATUS
Filed Jan. 4, 1938
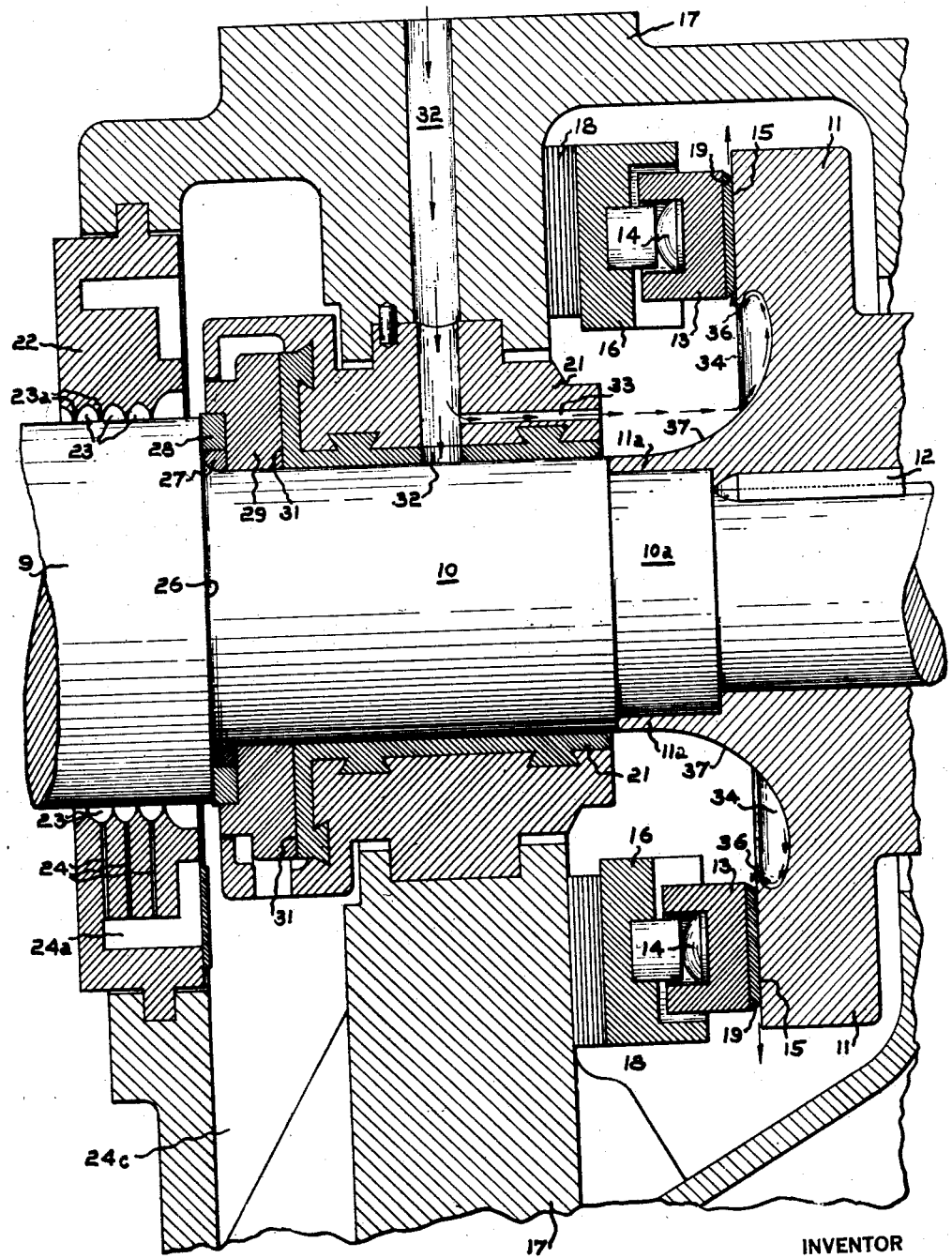
WITNESSES:
INVENTOR
EDWIN F. SMITH.
BY
ATTORNEY Patented Aug. 15, 1939

2,169,296

UNITED STATES PATENT OFFICE 2,169,296

LUBRICATING APPARATUS

Edwin F. Smith, Prospect Park, Pa., assignor to Westinghouse Electric & Manufacturing Company, East Pittsburgh, Pa., a corporation of Pennsylvania Application January 4, 1938, Serial No. 183,254

9 Claims. (Cl. 308—160)

My invention relates to lubricated bearings and more particularly to thrust bearings.

In thrust bearings of the well known Kingsbury or tilting shoe type, it is essential to provide sufficient oil, which shall be cool enough to allow for the formation of proper load-sustaining, wedge-shaped oil films. Bearings of this type are frequently lubricated by submersion in a bath of oil provided with an inlet and an outlet and having a more or less irregular flow due to internal mechanical construction. This type of lubrication results in a large portion of the oil which constituted the preceding film, and which has become heated due to high pressures and friction, uniting with the fresh oil, thus raising the temperature of the entering oil and preventing the formation of as good a film as would result if all the entering oil were fresh and relatively cool.

It is an object of my invention to overcome the above objections by directing a lubricant to the bearing surface and immediately removing it to reduce heating from friction.

It is a further object of my invention to provide a thrust bearing which is lubricated by a lubricant applied to the bearing surface and immediately removed, whereby less resistance is offered at high speeds than when an unnecessary area is moving in a bath of lubricant.

It is a further object of my invention to apply a lubricant simultaneously to all portions of the radial surface of a rotating disk.

These and other objects are effected by my invention as will be apparent from the following description and claims taken in accordance with the accompanying drawing, forming a part of this application in which:

The single figure is a longitudinal sectional view showing one application of my invention.

Referring now to the drawing, numeral 9 indicates a spindle, which, in operation receives a thrust load. The spindle 9 is provided with a journal 10 and a thrust collar 11, the latter being keyed thereto as at 12. The thrust collar has an annular thrust surface 15 engaging an annular series of shoes 13, tiltably mounted at 14 with respect to a supporting ring 16, which, in turn, is adjustably carried by the bearing block 17. The adjustment between ring 16 and block 17 is effected by spacing rings or shims 18, therebetween. The bearing shoes 13 are surfaced with bearing metal 19, in a manner well known in the art.

The spindle 9 is supported radially at the journal 10 by a bearing 21 of suitable construction carried by the block 17. The block is also provided at the side of the bearing 21 remote from the thrust bearing, with a packing gland 22 having annular grooves 23 separated by labyrinth walls 23a, the lower portion of each groove 23 being provided with a drain 24 leading to a drain chamber 24a having an overflow into the housing interior 24c provided by the block or pedestal structure 17.

The shaft 10 is of less diameter at the bearing 21 than at the gland 22, whereby a radial shoulder 26 is provided. Keyed on shaft 10 and abutting the shoulder 26, are bearing or spacing rings 27, 28, and 29, adapted to bear against the thrust surface 31 on the bearing 21.

The bearing 21 and block 17 are provided with a radially extending passage 32 for conducting lubricant to the journal 10 along the bearing surface. The passage 32 has a branch 33 extending therefrom axially through the bearing 21. A portion of the lubricant, supplied to the passage 32 under pressure, will flow through the branch opening 33, discharging therefrom against the radial bearing face of thrust collar 11. Normally the lubricant, upon contacting the face of the revolving thrust collar, would be thrown radially outward, due to centrifugal action, without lubricating equally the entire face of the collar; however, in accordance with the present invention and as hereinafter described, structure is provided to secure a more uniform lubricating action.

The thrust collar 11 has an annular groove 34, disposed inwardly of the thrust surface 15, and opening toward the bearing axis or undercut to provide an annular lip 36 at the outer edge thereof.

Preferably, the thrust collar 11 is formed with a concave-conoidal surface 37 extending toward the bearing 21 and serving to convey lubricant to the groove 34. Also, I prefer to have the spindle reduced, as shown at 10a to receive the hub extension 11a of the thrust collar so that the surface 37 of the extension constitutes a continuation of the journal surface 10 facilitating passage of lubricant from the journal bearing to the groove.

In operation, lubricant escaping from the adjacent end of the bearing 21, and particularly that discharging from the passage 33, engages the surface 37 and passes therealong to the groove 34. As the surface 37 has a progressively increasing radial component of direction with increasing radius, not only is there provided a surface easily changing the direction of flow of the lubricant, but one properly disposed for the centrifugal force thereof, this type of contour at the entrance of the groove minimizing churning or atomization of lubricant entering the groove. The groove 34 will be filled with the lubricant in this way and due to centrifugal action and to the fact that the groove opens toward the bearing axis, the groove will have lubricant discharged circumferentially therefrom, surplus lubricant overflowing the lip 36 and passing radially outward over the thrust surface 15. As the edge of the annular lip is concentric with the bearing axis, it is assured that the overflow will occur uniformly throughout the circumference of the lip, with the result that the thrust surface is uniformly supplied with fresh lubricant. As this arrangement provides for continuous supply of lubricant to the inner margin of the thrust surface 15 and for the continuous discharge of lubricant from the outer margin thereof, it is assured that the lubricant used to form the wedge films for the thrust shoes shall be fresh, of suitable temperature, and uncontaminated.

As the thrust bearing is combined in a unitary manner with the radial bearing, it will be apparent that a single source of lubricant, that is, the passage 32, may be provided for both bearings, and the contour of the thrust collar is such that a single small passage 33 is sufficient to keep the groove 34 filled with lubricant with a minimum of atomization. While I prefer to provide a passage 33 as the principal source of lubricant for the thrust bearing, this arrangement also assuring of fresh lubricant therefor, it will be apparent that lubricant escaping from the right hand end of the bearing may travel axially along the shaft and the surface 37 to enter the groove and, in some cases, surplus lubricant escaping from the bearing may be sufficient.

While I have shown my invention as applied to a bearing construction including a horizontal journal bearing and an adjacent thrust bearing wherein the thrust surfaces are arranged vertically, it will be apparent that the invention may also be applied to the reverse arrangement where the journal bearing is vertical and the bearing surfaces of the thrust bearing are horizontally disposed, in which event the groove 34 would still be effective to provide for accumulation of lubricant therein and for the overflow of lubricant therefrom to the thrust bearing surfaces, whereby the latter are uniformly and circumferentially supplied with lubricant in a continuous manner. As shown, the housing 17 has an adequate hollow interior providing for the discharge of lubricant escaping from both bearings, whereby the positive system of supplying both bearings with fresh lubricant is fully effective.

While only one thrust collar has been shown in this disclosure, it is obvious that the invention can be applied with equally desirable results, to a plurality of thrust collars.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a thrust bearing, a rotary thrust collar having an annular thrust surface, means carried by the collar for centrifugally applying lubricant simultaneously and equally to the inner margin of said thrust surface, and means providing for the removal of lubricant from the vicinity of the thrust collar whereby submerging of the collar in a bath of lubricant is avoided.

2. In a thrust bearing, a rotary thrust collar having an annular thrust surface, means for centrifugally applying lubricant simultaneously and equally to all portions of said thrust surface, and means providing for the removal of lubricant from the vicinity of the thrust collar whereby submerging of the collar in a bath of lubricant is avoided.

3. In a thrust bearing, a rotary thrust collar having an annular thrust surface, means for centrifugally applying lubricant simultaneously and equally to the inner margin of said thrust surface, and means providing for the discharge of lubricant from the outer margin of said thrust surface, said first means comprising an annular groove formed in the thrust collar inwardly of the annular thrust surface and providing for the accommodation of lubricant therein and for the overflow of lubricant therefrom to the inner margin of said annular thrust surface.

4. In a thrust bearing, a rotary thrust collar having an annular thrust surface, means for centrifugally applying lubricant simultaneously and equally to the inner margin of said thrust surface, and means providing for the discharge of lubricant from the outer margin of said thrust surface, said first means comprising an annular groove formed in the thrust collar inwardly of the annular thrust surface and providing for the accumulation of lubricant therein and for the overflow of lubricant therefrom to the inner margin of said annular thrust surface, said annular groove having an annular lip concentric with the bearing axis and over which lubricant accumulating in the groove overflows in passing from the groove to the annular thrust surface.

5. In a thrust bearing, a rotary thrust collar having an annular thrust surface and an annular groove disposed inwardly of said thrust surface, said groove opening toward the bearing axis to provide for accumulation of lubricant therein and for circumferential overflow therefrom to the thrust surface; and means for supplying lubricant to the groove.

6. In a bearing construction, a housing, a journal bearing carried by the housing, a spindle extending through the housing and having a journal portion fitting said bearing, a thrust bearing within the housing and including means providing non-rotary thrust surfaces and a rotary collar having an annular thrust surface cooperating with said non-rotary thrust surfaces, said housing having an interior abutment for said means so located that the thrust bearing may be disposed adjacent to one end of the journal bearing, means for fixedly securing said collar to the spindle, said collar having an annular groove disposed inwardly of its annular thrust surface and having a concavo-conoidal surface forming a continuation of one side of the groove and terminating adjacent to the journal, said groove providing for the accumulation of lubricant therein and for the overflow of lubricant therefrom to the thrust surface, and means for supplying lubricant to said journal bearing and to said concavo-conoidal surface for travel therealong into said groove.

7. In a bearing construction, a housing, a journal bearing carried by the housing, a spindle extending through the housing and having a journal portion fitting said bearing, a thrust bearing within the housing and including means providing non-rotary thrust surfaces and a rotary collar having an annular thrust surface cooperating with said non-rotary thrust surfaces, said housing having an interior abutment for said means so located that the thrust bearing may be disposed adjacent to one end of the journal bearing, means for fixedly securing said collar to the spindle, said collar having an annular groove disposed inwardly of its annular thrust surface and arranged to provide for the accumulation of lubricant therein and for the overflow of lubricant therefrom to the annular thrust surface, means for supplying lubricant to the journal bearing, and means for supplying to said groove at least a part of the lubricant escaping from the adjacent end of the journal bearing, said housing having a hollow interior providing for the discharge of lubricant escaping from both bearings.

8. In a bearing construction, a housing, a journal bearing carried by the housing, a spindle extending through the housing and having a journal portion fitting said bearing, a thrust bearing within the housing and including means providing non-rotary thrust surfaces and a rotary collar having an annular thrust surface cooperating with said non-rotary thrust surfaces, said housing having an interior abutment for said means so located that the thrust bearing may be disposed adjacent to one end of the journal bearing, means for fixedly securing said collar to the spindle, said collar having an annular groove disposed inwardly of its annular thrust surface and having a concavo-conoidal surface forming a continuation of one side of the groove and terminating adjacent to the journal, said groove providing for the accumulation of lubricant therein and for overflow of lubricant therefrom to the thrust surface, and means for supplying lubricant to the bearings and including registering portions of a passage communicating with the bearing surface of the journal bearing and a branch passage arranged to discharge onto said concavo-conoidal surface.

9. In a bearing construction, a housing, a journal bearing carried by the housing, a spindle extending through the housing and having a journal portion fitting said bearing, said spindle having a reduced portion adjacent to one end of the journal portion, a thrust bearing within the housing and including means providing non-rotary thrust surfaces and a rotary collar having an annular thrust surface cooperating with said non-rotary thrust surfaces, said housing having an interior abutment for said means so located that the thrust bearing may be disposed adjacent to the end of the journal bearing adjoining the spindle reduced portion, said collar having a hub extension encompassing said spindle reduced portion and abutting the adjacent end of the journal portion, means for fixedly securing said collar to the spindle, said collar having an annular groove disposed inwardly of its annular thrust surface and having a concavo-conoidal surface forming a continuation of one side of the groove and terminating at the outer end of said hub extension so that the latter has a surface adjacent to the journal surface forming in effect a continuation thereof, said annular groove providing for the accumulation of lubricant therein and for the overflow of lubricant therefrom to said annular thrust surface, and means for supplying lubricant to the journal bearing and to said concavo-conoidal surface for travel therealong to said groove, said housing having a hollow interior providing for discharge of lubricant escaping from both bearings.

EDWIN F. SMITH.